United States Patent [19]

Brouard et al.

[11] 4,234,482
[45] Nov. 18, 1980

[54] SUBSTITUTED 3-CARBALKOXY 4-ALKYLAMINO-AZOBENZENE COMPOUND AS DISPERSE DYESTUFFS FOR SYNTHETIC FIBERS

[75] Inventors: Claude M. H. E. Brouard, Sotteville les Rouen; Jean-Pierre H. Stiot, Saint Pierre les Elbeuf, both of France

[73] Assignee: Produits Chimiques Ugine Kuhlmann Service Propriete Industrielle, Paris, France

[21] Appl. No.: 594,405

[22] Filed: Jul. 8, 1975

[30] Foreign Application Priority Data

Aug. 7, 1974 [FR] France .................. 74 23605

[51] Int. Cl.³ .................. C09B 29/04; C09B 29/36; C09B 33/16; D06P 3/54
[52] U.S. Cl. .................. 260/187; 260/152; 260/156; 260/158; 260/207; 260/207.1; 260/326.13 R; 260/326.13 C; 260/456 P; 260/465 D; 546/329; 560/21; 560/23; 560/47
[58] Field of Search .................. 260/207, 207.1, 186, 260/187

[56] References Cited

U.S. PATENT DOCUMENTS

| 2,135,008 | 11/1938 | Kleiner et al. | 260/207.1 |
| 2,782,188 | 2/1957 | Merian | 260/207.1 |
| 3,335,126 | 8/1967 | Baron et al. | 260/207.1 |

FOREIGN PATENT DOCUMENTS

| 475158 | 7/1951 | Canada | 260/207.1 |
| 741331 | 8/1966 | Canada | 260/207.1 |
| 43-7032 | 3/1967 | Japan | 260/207.1 |
| 2101912 | 7/1971 | United Kingdom | 260/207.1 |

Primary Examiner—Floyd D. Higel
Attorney, Agent, or Firm—Beveridge, DeGrandi, Kline & Lunsford

[57] ABSTRACT

Azo dyestuffs, insoluble in water, are represented by the formula:

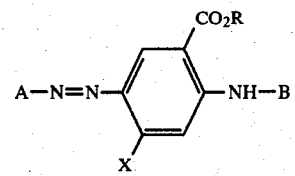

wherein A represents the residue of a diazotizable benzene component carrying at least two substituents or the residue of a diazotizable heterocyclic component, R represents alkyl, B represents an unsubstituted or substituted alkyl group, and X represents hydrogen, chlorine, bromine, acylamino, benzoylamino, alkoxycarbonylamino, phenoxycarbonylamino, alkylsulfonylamino or phenylsulfonylamino, the dyestuff molecule being free of groups causing water solubility by formation of ions. These dyestuffs can be used for dyeing of hydrophobic fibers, in particular polyester fibers. Affinity is excellent and there are obtained bright, full-bodied shades very fast to wet tests, sublimation, abrasion and light.

2 Claims, No Drawings

SUBSTITUTED 3-CARBALKOXY 4-ALKYLAMINO-AZOBENZENE COMPOUND AS DISPERSE DYESTUFFS FOR SYNTHETIC FIBERS

The present invention relates to azo dyestuffs that are insoluble in water, which dyestuffs are particularly advantageous for the dyeing of hydrophobic fibers.

The dyestuffs of this invention may be represented by the general formula:

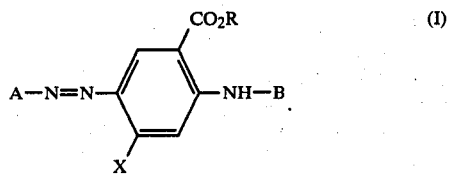

(I)

wherein
A represents the residue of a diazotizable benzene component carrying at least two substituents or the residue of a heterocyclic diazotizable component which may or may not be substituted;
R represents alkyl of 1 to 4 carbon atoms, preferably methyl or ethyl;
B represents either
a residue of the formula $-(CH_2)_n-OR'$ wherein n is a whole number from 1 to 4, preferably 2, and R' represents hydrogen or acyl of 2 to 5 carbon atoms, benzoyl, carbalkoxy of 2 to 5 carbon atoms, carbophenoxy, alkyl sulfonyl of 1 to 4 carbon atoms or phenysulfonyl, of
alkyl containing 1 to 4 carbon atoms or substituted alkyl of 1 to 4 carbon atoms wherein the substituent is one or more halogen atoms or one cyano, nitro, phenyl, pyridyl, pyrrolidonyl, phenoxy, alkoxy of 1 to 4 carbon atoms, carbophenoxy, alkylsulfonyl of 1 to 4 carbon atoms, phenylsulfonyl, acyl of 2 to 5 carbon atoms or cyanalkoxy of 2 to 5 carbon atoms or also a carbalkoxy group of 2 to 5 carbon atoms which can itself be substituted by cyano, acyl of 2 to 5 carbon atoms, carbalkoxy of 2 to 5 carbon atoms or acyloxy of 2 to 5 carbon atoms; and
X represents hydrogen, bromine, chlorine, acylamino of 2 to 5 carbon atoms, benzoylamino, alkoxycarbonylamino of 2 to 5 carbon atoms, phenoxycarbonylamino, alkylsulfonylamino of 1 to 4 carbon atoms or phenylsulfonylamino,
the dyestuffs molecule being free of groups causing hydrosolubility (water solubility) by formation of ions.

As examples of substituents of residue A, when A is arylene there are chlorine, cyano, nitro, mesyl, carbomethoxy, carbethoxy, phenylazo groups; and when A is heterocyclic, the substituent may be nitro, acetyl, carbethoxy, methyl, phenyl and cyano groups.

As examples of B residues, there can be cited more particularly the groups β-hydroxyethyl, β-acetoxyethyl, β-propionyloxyethyl, β-butyryloxyethyl, β-methoxy-carbonyloxyethyl, β-ethoxycarbonyloxyethyl, β-benzoyloxyethyl, β-phenoxycarbonyloxyethyl, β-mesyloxyethyl, β-phenylsulfonyloxyethyl, β-cyanethyl, β-chlorethyl, 3,3,4,4,4-pentafluorobutyl, benzyl, β-phenethyl, β-(2- or 4-pyridyl) ethyl, β-(2-oxo3-pyrrolidinyl) ethyl, β-methoxy (or ethoxy) ethyl, β-phenoxyethyl, β-carbomethoxyethyl, β-carbethoxyethyl, β-nitroethyl, β,γ-dichloropropyl, β-mesylethyl, β-ethylsulfonylethyl, β-phenylsulfonylethyl, β-acetylethyl, β-(2-cyanoethoxy) ethyl, β-phenoxycarbonylethyl, β-acetonyloxycarbonylethyl, β-(2acetyl carbethoxy) ethyl.

The dyestuffs of formula (I) can be prepared by coupling of the diazo derivative of an A—NH₂ base with a coupler of the formula:

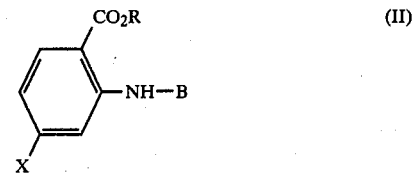

(II)

B, R and X being as defined above.

As diazotizable A—NH₂ bases there can be mentioned more particularly those of the formulae:

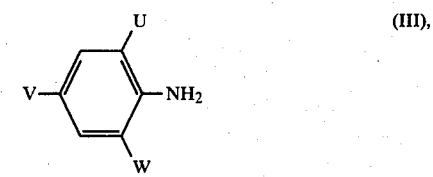

(III),

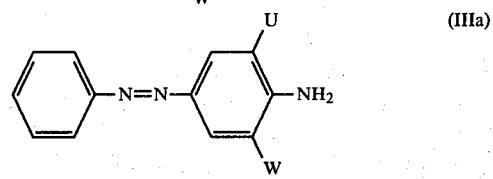

(IIIa)

wherein U represents chlorine, bromine, cyano, nitro, carbalkoxy or alkylsulfonyl, V represents cyano, nitro, alkylsulfonyl or phenylazo and W represents hydrogen, chlorine, bromine, cyano or nitro.

As example of diazotizable bases of the type of formula (III), there can be cited the following amines: 2-chloro or 2- bromo 4-nitro aniline, 2-chloro or 2-bromo 4-mesyl aniline, 2,4-dicyano aniline, 2,4-dicyano 6-chloro (or-bromo) aniline, 4-amino 5-mesyl 3-chloro (or bromo) benzonitrile, 2,6-dichloro 4-nitro aniline, 2,6-dibromo 4-nitro aniline, 2-amino 3-chloro (or bromo) 5-mesyl benzonitrile, 2,4-dinitro aniline, 2,4,6-trinitro aniline, 2,4-dinitro 6-chloro (or bromo) aniline, 2-amino 3,5-dinitro benzonitrile, 2-carbomethoxy 4-nitro aniline, 2-carbomethoxy 4,6-dinitro aniline, 2-carbomethoxy 4-nitro 6-chloro (or bromo) aniline, 2-carbomethoxy 4-nitro 6-cyano aniline, 2-amino 5-nitro benzonitrile, 2-amino 3-chloro (or bromo) 5-nitro benzonitrile, 2,6-dicyano 4-nitro aniline, 2-amino 3-mesyl 5-nitro benzonitrile, 2-mesyl 4-nitro aniline, 2-mesyl 4-nitro 6-chloro (or bromo) aniline, 2,4-dinitro 6-mesyl aniline.

As A—NH₂ diazotizable bases there can also be mentioned amino-monoazo compounds of the type of formula (IIIa) such as: 4-amino 3-chloro azobenzene, 4-amino 3-bromo azobenzene, 4-amino 3-nitro azobenzene, 4-amino 3-cyano azobenzene, 4-amino 3,5-dichloro azobenzene, 4-amino 3,5-dibromo azobenzene, 4-amino 3,5-dicyano azobenzene.

The A—NH₂ diazotable base can also be a heterocyclic compound such as: 2-amino 5-nitro thiazole, 2-amino 5-cyano thiazole, 2-amino 5-mesyl thiazole, 2-amino 6-bromo benzothiazole, 2-amino 6-chloro benzothiazole, 2-amino 6-nitro benzothiazole, 2-amino 6- cyano benzothiazole, 2-amino 6-mesyl benzothiazole, 2-amino 6-carbethoxy benzothiazole, 2-amino 6-(β-acetoxy-carbethoxy) benzothiazole, 3-amino 5-nitro 2,1-benzisothiazole, 3-amino 5-chloro 2,1-benzisothiazole, 3-amino 5-bromo 2,1-benzisothiazole, 3-amino 5-carbethoxy 2,1-benzisothiazole, 3-amino 5-mesyl 2,1-benzisothiazole, 2-amino 5-phenyl 1,3,4-thiadiazole, 2-amino 5-mesyl 1,3,4-thiadiazole, 2-amino 5-nitro 1,3,4-thiadiazole, 5-amino 1,2,4-thiadiazole, 3-phenyl 5-amino 1,2,4-thiadiazole, 2-amino 3-nitro 5-acetyl thiophene, 2-amino 3-cyano 5-carbethoxy thiophene, 3-methyl 5-amino isothiazole, 3-methyl 4-nitro 5-amino isothiazole.

Diazotation of the A—NH$_2$ bases can be performed by the usual processes, for example with a nitrosylsulfuric acid in concentrated sulfuric acid or in a mixture of sulfuric acid-acetic acid-propionic acid.

Some couplers of formula (II) are already known. In a general way, they can be prepared by reaction of an anthranilate represented by the formula:

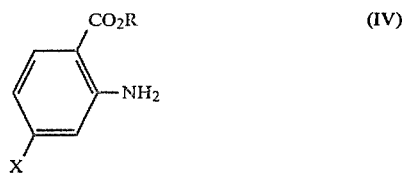

(IV)

where R and X are defined above, with a halide of the formula: B—hal in the presence of a neutralizing agent, such as calcium carbonate, or with a derivative carrying an activated ethylene bond, in the presence of a catalyst, such as acetic acid, copper acetate and benzyltrimethylammonium hydroxide.

Coupling of the diazo derivatives of the A—NH$_2$ bases with couplers of formula (II) can be performed in a known way, for example, in an acid medium, optionally in the presence of catalysts or buffering agents, as for example, pyridine and sodium acetate, which have an effect on the speed of the coupling reaction.

The dyestuffs of formula (I), wherein B represents a —(CH$_2$)$_n$—O-acyl residue, can also be prepared by esterification of the corresponding dyestuffs of formula (I), wherein B represents a —(CH$_2$)$_n$—OH residue, by means of an acid anhydride or acid chloride.

The dyestuffs of the invention, alone or in mixtures, are very suitable for dyeing or printing of various articles, particularly fibers and fabrics with a base of diacetate or triacetate of cellulose and of polyamides, but especially of aromatic polyesters. Affinity is excellent; and there are obtained bright, full-bodied shades very fast to wet tests, sublimation, abrasion or friction and light.

The dyestuffs of this invention are also very suitable for the dyeing of texturized yarns having a polyester base. They can also be used for the techniques of transfer printing and the relatively great solubility of a good number of them in solvents make possible their use for continuous dyeing in a solvent medium.

For dyeing applications, it is advantageous that the dyestuffs of this invention be in a finely divided state. This is why the dyes according to the invention are preferably pre-dispersed with dispersing agents, such as soap, alkali residues of sulfite cellulose, the products resulting from the condensation of naphthalene-sulfonic acids with formaldehyde, in particular, dinaphythylmethane-disulfonates, the sulfonated esters of succinic acid, the products obtained by condensation of cresols with formaldehyde and naphthol sulfonic acids.

Dyeing of the polyester fibers can be performed by impregnation in the presence of a vehicle at temperatures going from 80° C. to 125° C. or without vehicles or carriers under pressure between about 100° C. and 140° C. They can also be sized or printed with aqueous dispersions of the dyestuffs, then the impregnation obtained can be fixed between 140° and 220° C., for example, with superheated steam, air or by contact with a heating surface. The temperature range between 180° C. and 200° C. is particularly favorable for this purpose.

Instead of impregnation, the dyes according to the invention can also be applied by printing. For this purpose, there can be used, for example, a printing dye which contains in addition auxiliary agents currently used in printing, as wetting and thickening agents, the dyestuffs finely dispersed possibly in mixture with a dye for cotton and in the presence of urea and/or an acid-binding agent.

Because of their good wool and cotton reserve, the dyes according to the invention are also suitable for dyeing mixed polyester-wool and polyester-cotton fabrics.

The following examples, wherein proportions are by weight, unless indicated otherwise, illustrate the present invention.

EXAMPLE 1

There is heated, with reflux, for 30 hours a mixture of 75 parts of methyl anthranilate, 75 parts of ethyl acrylate, and 15 parts of crystallizable acetic acid. By distillation, there are obtained 41 parts of methyl N-(2-carbethoxyethyl) anthranilate which boils at 180° C. under 5 torrs.

| Analysis: | C % | H % | N % |
|---|---|---|---|
| Calculated for C$_{13}$H$_{17}$NO$_4$ | 62.15 | 6.77 | 5.57 |
| Found | 62.3 | 6.77 | 5.71 |

EXAMPLE 2

The procedure of example 1 is followed, but the methyl anthranilate is replaced by 82.5 parts of ethyl anthranilate. There are obtained 55 parts of ethyl N-(2-carbethoxy ethyl) anthranilate which boils at 177° C. under 2 torrs.

| Analysis: | C % | H % | N % |
|---|---|---|---|
| Calculated for C$_{14}$H$_{19}$NO$_4$ | 63.39 | 7.16 | 5.28 |
| Found | 63.06 | 6.94 | 5.33 |

EXAMPLE 3

There is heated, with reflux, for 8 hours a mixture of 165 parts of ethyl anthranilate, 50 parts of acrylonitrile and 5 parts of copper acetate. The reaction mass is filtered and the filtrate is distilled. There are obtained 75 parts of ethyl N-(2-cyanoethyl) anthranilate which boils at 170° C. under 1.5 torr.

| Analysis: | C % | H % | N % |
|---|---|---|---|
| Calculated for C$_{12}$H$_{14}$N$_2$O$_2$ | 66.05 | 6.42 | 12.84 |
| Found | 65.74 | 6.28 | 12.8 |

EXAMPLE 4

There is heated, with reflux, for 30 hours, a mixture of 165 parts of ethyl anthranilate, 330 parts of ethylene chlorhydrin, 200 parts of calcium carbonate and 200 parts of water. It is filtered hot, the sludges are washed with 300 parts of hot water, the organic layer is decanted and distilled. Thus, there are obtained 43 parts of ethyl N-(2-hydroxyethyl) anthranilate which boils at 190° C. under 4 torrs.

| Analysis: | C % | H % | N % |
|---|---|---|---|
| Calculated for $C_{11}H_{15}NO_3$ | 63.15 | 7.17 | 6.69 |
| Found | 63.10 | 7.11 | 6.60 |

EXAMPLE 5

There is heated, with reflux, for 16 hours a mixture of 48 parts of methyl N-(2-hydroxyethyl) anthranilate, 50 parts of crystallizable acetic acid and 25 parts of acetic anhydride. There are collected by distillation 42 parts of methyl N-(2-acetoxyethyl) anthranilate which boils at 178° C. under 1 torr.

| Analysis: | C % | H % | N % |
|---|---|---|---|
| Calculated for $C_{12}H_{15}NO_4$ | 60.75 | 6.32 | 5.90 |
| Found | 60.51 | 6.37 | 5.98 |

EXAMPLE 6

There are dissolved 8.4 parts of 2-amino 5-nitro benzonitrile in 50 parts of a 50/50 mixture of acetic acid and propionic acid. It is cooled to 0°-5° C., then at this temperature there is introduced a mixture of 3.5 parts of sodium nitrite and 16.5 parts of sulfuric acid at 66° Be. It is left, with stirring, for 2 hours at 0°-5° C. and the excess nitrous acid is destroyed by addition of 0.1 part of urea. In the solution thus obtained, is poured a mixture of 12.6 parts of methyl N-(2-acetoxyethyl) anthranilate and 20 parts of crystallizable acetic acid. While the mixture is kept at 0°-5° C., there are gradually introduced into the mixture 30 parts of ice water. The precipitate is filtered, it is taken up in 300 parts of water, left, with stirring, for an hour and filtered again. With the dye thus obtained, i.e. 2-cyano 4-nitro 3'-carbomethoxy 4'-(2-acetoxyethylamino) azobenzene, polyester fibers are dyed a very bright scarlet shade presenting excellent properties, in particular a remarkable fastness to light.

The following table sets forth other examples of dyes according to the invention obtained as in example 6 by coupling of the diazo derivative of the A—NH₂ base indicated in the second column with the coupler of formula (II) indicated in the third column.

| Ex. | A—NH₂ Base | Coupler of formula (II) | Color on polyester |
|---|---|---|---|
| 7 | 2-amino 5-nitro benzonitrile | ethyl N-(2-acetoxyethyl)anthranilate | scarlet |
| 8 | 2-amino 5-nitro benzonitrile | methyl N-(2-hydroxyethyl)anthranilate | red |
| 9 | 2-amino 5-nitro benzonitrile | ethyl N-(2-hydroxyethyl)anthranilate | " |
| 10 | 2-amino 5-nitro benzonitrile | methyl N-(2-propionyloxyethyl) anthranilate | scarlet |
| 11 | 2-amino 5-nitro benzonitrile | methyl N-(2-butyryloxyethyl) anthranilate | " |
| 12 | 2-amino 5-nitro benzonitrile | methyl N-(2-benzoyloxyethyl) anthranilate | " |
| 13 | 2-amino 5-nitro benzonitrile | ethyl N-(2-benzolyloxyethyl) anthranilate | " |
| 14 | 2-amino 5-nitro benzonitrile | methyl N-(2-methoxycarbonyloxyethyl) anthranilate | " |
| 15 | 2-amino 5-nitro benzonitrile | ethyl N-(2-methoxycarbonyloxyethyl) anthranilate | " |
| 16 | 2-amino 5-nitro benzonitrile | methyl N-(2-ethoxycarbonyloxyethyl) anthranilate | " |
| 17 | 2-amino 5-nitro benzonitrile | ethyl N-(2-ethoxycarbonyloxyethyl) anthranilate | " |
| 18 | 2-amino 5-nitro benzonitrile | methyl N-(2-phenoxycarbonyloxyethyl) anthranilate | " |
| 19 | 2-amino 5-nitro benzonitrile | ethyl N-(2-phenoxycarbonyloxyethyl) anthranilate | " |
| 20 | 2-amino 5-nitro benzonitrile | 2-(2-carbomethoxy phenylamino)-ethyl methanesulfonate | " |
| 21 | 2-amino 5-nitro benzonitrile | 2-(2-carbethoxy phenylamino)-ethyl methanesulfonate | " |
| 22 | 2-amino 5-nitro benzonitrile | 2-(2-carbomethoxy phenylamino)-ethyl benzenesulfonate | " |
| 23 | 2-amino 5-nitro benzonitrile | 2-(2-carbethoxy phenylamino)-ethyl benzenesulfonate | " |
| 24 | 2-amino 5-nitro benzonitrile | methyl N-(2-cyanoethyl)anthranilate | yellow scarlet |
| 25 | 2-amino 5-nitro benzonitrile | ethyl N-(2-cyanoethyl)anthranilate | " |
| 26 | 2-amino 5-nitro benzonitrile | methyl N-(2-chloroethyl)anthranilate | scarlet |
| 27 | 2-amino 5-nitro benzonitrile | ethyl N-(2-chloroethyl)anthranilate | " |
| 28 | 2-amino 5-nitro | methyl N-(3,3,4,4,4-pentafluorobutyl) anthranilate | yellow scarlet |

-continued

| Ex. | A—NH₂ Base | Coupler of formula (II) | Color on polyester |
|---|---|---|---|
| 29 | 2-amino 5-nitro benzonitrile | ethyl N-(3,3,4,4-pentafluorobutyl) anthranilate | " |
| 30 | 2-amino 5-nitro benzonitrile | methyl N-benzyl anthranilate | scarlet |
| 31 | 2-amino 5-nitro benzonitrile | ethyl N-benzyl anthranilate | " |
| 32 | 2-amino 5-nitro benzonitrile | methyl N-phenethyl anthranilate | " |
| 33 | 2-amino 5-nitro benzonitrile | ethyl N-phenethyl anthranilate | " |
| 34 | 2-amino 5-nitro benzonitrile | methyl N-β-(2-pyridyl)ethyl anthranilate | " |
| 35 | 2-amino 5-nitro benzonitrile | ethyl N-β-(2-pyridyl)ethyl anthranilate | " |
| 36 | 2-amino 5-nitro benzonitrile | methyl N-β-(4-pyridyl)ethyl anthranilate | " |
| 37 | 2-amino 5-nitro benzonitrile | ethyl N-β-(4-pyridyl)ethyl anthranilate | " |
| 38 | 2-amino 5-nitro benzonitrile | 3-[2-(2-carbomethoxy phenylamino) ethyl]2-pyrrolidinone | " |
| 39 | 2-amino 5-nitro benzonitrile | 3-[2-(2-carbethoxy phenylamino)ethyl] 2-pyrrolidone | " |
| 40 | 2-amino 5-nitro benzonitrile | methyl N(2-methoxyethyl)anthranilate | " |
| 41 | 2-amino 5-nitro benzonitrile | ethyl N-(2-ethoxyethyl)anthranilate | " |
| 42 | 2-amino 5-nitro benzonitrile | methyl N-(2-phenoxyethyl)anthranilate | " |
| 43 | 2-amino 5-nitro benzonitrile | ethyl N-(2-phenoxyethyl)anthranilate | " |
| 44 | 2-amino 5-nitro benzonitrile | methyl N-(2-carbethoxyethyl) anthranilate | " |
| 45 | 2-amino 5-nitro benzonitrile | ethyl N-(2-carbethoxyethyl) anthranilate | " |
| 46 | 2-amino 5-nitro benzonitrile | phenyl 3-(2-carbomethoxy phenylamino) propionate | " |
| 47 | 2-amino 5-nitro benzonitrile | phenyl 3-(2-carbethoxy phenylamino) propionate | " |
| 48 | 2-amino 5-nitro benzonitrile | methyl N-(2-acetonyloxycarbonyl ethyl) anthranilate | " |
| 49 | 2-amino 5-nitro benzonitrile | oxo-3-butyl 3-(2-carbomethoxy phenylamino) propionate | " |
| 50 | 2-amino 5-nitro benzonitrile | methyl N-(2-acetylethyl)anthranilate | " |
| 51 | 2-amino 5-nitro benzonitrile | ethyl N-(2-acetylethyl) anthranilate | " |
| 52 | 2-amino 5-nitro benzonitrile | methyl N-(2-β-cyanoethoxyethyl) anthranilate | " |
| 53 | 2-amino 5-nitro benzonitrile | ethyl N-(2-β-cyanoethoxyethyl) anthranilate | " |
| 54 | 2,6-dichloro 4-nitro aniline | methyl N-(2-acetoxyethyl) anthranilate | yellow brown |
| 55 | 2,6-dichloro 4-nitro aniline | methyl N-(2-carbethoxyethyl) anthranilate | " |
| 56 | 2,6-dichloro 4-nitro aniline | methyl N-(2-methoxycarbonyloxyethyl) anthranilate | " |
| 57 | 2,6-dichloro 4-nitro aniline | methyl N-(2-cyanoethyl) anthranilate | yellow brown |
| 58 | 2,6-dichloro 4-nitro aniline | methyl N-phenethyl anthranilate | yellow brown |
| 59 | 2-chloro 4-nitro aniline | methyl N-(2-acetoxyethyl) anthranilate | orange |
| 60 | 2,6-dibromo 4-nitro aniline | methyl N-(2-acetoxyethyl) anthranilate | yellow brown |
| 61 | 2-bromo 4-nitro aniline | methyl N-(2-acetoxyethyl) anthranilate | orange |
| 62 | 2-chloro 4-mesyl aniline | methyl N-(2-acetoxyethyl) anthranilate | " |
| 63 | 2-bromo 4-mesyl aniline | methyl N-(2-acetoxyethyl) anthranilate | " |
| 64 | 2,4-dicyano aniline | methyl N-(2-acetoxyethyl) anthranilate | " |
| 65 | 2-chloro 4,6-dicyano aniline | methyl N-(2-acetoxyethyl) anthranilate | yellow scarlet |
| 66 | 2-bromo 4,6-dicyano aniline | methyl N-(2-acetoxyethyl) anthranilate | yellow scarlet |
| 67 | 2-chloro 4,6-dinitro aniline | methyl N-(2-carbethoxy ethyl) anthranilate | red |

-continued

| Ex. | A—NH₂ Base | Coupler of formula (II) | Color on polyester |
|---|---|---|---|
| 68 | 2-chloro 4,6-dinitro aniline | methyl N-(2-acetoxy ethyl)anthranilate | " |
| 69 | 2-chloro 4,6-dinitro aniline | methyl N-(2-methoxycarbonyloxy ethyl) anthranilate | " |
| 70 | 2-bromo 4,6-dinitro aniline | methyl N-phenethyl anthranilate | " |
| 71 | 2-amino 3-chloro 5-nitro benzonitrile | methyl N-(2-acetoxy ethyl) anthranilate | red |
| 72 | 2-amino 3-chloro 5-nitro benzonitrile | methyl N-(2-carbethoxy ethyl) anthranilate | " |
| 73 | 2-amino 3-chloro 5-nitro benzonitrile | methyl N-(2-methoxycarbonyloxy ethyl) anthranilate | " |
| 74 | 2-amino 3-bromo 5-nitro benzonitrile | methyl N-phenethyl anthranilate | " |
| 75 | methyl 2-amino 5-nitro benzoate | methyl N-(2-acetoxy ethyl) anthranilate | red orange |
| 76 | methyl 2-amino 5-nitro benzoate | methyl N-(2-carbethoxy ethyl) anthranilate | " |
| 77 | methyl 2-amino 5-nitro benzoate | methyl N-(2-acetoxy ethyl) anthranilate | " |
| 78 | 2-mesyl 4-nitro aniline | methyl N-(2-acetoxy ethyl) anthranilate | scarlet |
| 79 | 2-mesyl 4-nitro aniline | methyl N-(2-carbethoxy ethyl) anthranilate | " |
| 80 | 2-mesyl 4-nitro aniline | methyl N-(2-methoxycarbonyloxy ethyl) anthranilate | " |
| 81 | 4-amino 3-chloro azobenzene | methyl N-(2-acetoxy ethyl) anthranilate | orange |
| 82 | 4-amino 3,5-dichloro azobenzene | methyl N-(2-acetoxy ethyl) anthranilate | yellow brown |
| 83 | 4-amino 3,5-dichloro azobenzene | methyl N-(2-carbethoxy ethyl) anthranilate | " |
| 84 | 4-amino 3,5-dichloro azobenzene | methyl N-(2-methoxycarbonyloxy ethyl) anthranilate | " |
| 85 | 2-amino 5-nitro thiazole | methyl N-(2-acetoxy ethyl)anthranilate | red |
| 86 | 2-amino 5-nitro thiazole | methyl N-(2-carbethoxy ethyl) anthranilate | " |
| 87 | 2-amino 5-nitro thiazole | methyl N-(2-methoxycarbonyloxy ethyl) anthranilate | " |
| 88 | 2-amino 6-nitro benzothiazole | methyl N-(2-carbethoxy ethyl) anthranilate | " |
| 89 | 2-amino 6-nitro benzothiazole | methyl N-(2-acetoxy ethyl)anthranilate | " |
| 90 | 2-amino 6-nitro benzothiazole | methyl N-(2-methoxycarbonyloxy ethyl) anthranilate | " |
| 91 | 2-amino 6-carbethoxy benzothiazole | methyl N-(2-acetoxy ethyl)anthranilate | scarlet |
| 92 | 3-amino 5-nitro 2,1-benzisothiazole | " | violet |
| 93 | 3-amino 5-nitro 2,1-benzisothiazole | methyl N-(2-carbethoxy ethyl) anthranilate | " |
| 94 | 3-amino 5-nitro 2,1-benzisothiazole | methyl N-(2-methoxycarbonyloxy ethyl) anthranilate | violet red |
| 95 | 2-amino 5-phenyl 1,3,4-thiadiazole | methyl N-(2-acetoxy ethyl) anthranilate | scarlet |
| 96 | 5-amino 3-phenyl 1,2,4-thiadiazole | methyl N-(2-acetoxy ethyl) anthranilate | " |
| 97 | 5-acetyl 2-amino 3-nitro thiophene | methyl N-(2-acetoxy ethyl) anthranilate | violet red |
| 98 | 2-amino 5-carbethoxy 3-cyano 4-methyl thiophene | methyl N-(2-acetoxy ethyl) anthranilate | scarlet |
| 99 | 2-amino 5-nitro benzonitrile | ethyl 3-(5-acetylamino 2-carbomethoxy phenylamino) propionate | red |
| 100 | 2-amino 5-nitro benzonitrile | methyl N-[3-(2-carbethoxy ethylamino) 4-carbomethoxy phenyl] carbamate | " |
| 101 | 2-amino 5-nitro benzonitrile | ethyl 3-(2-carbomethoxy 5-methylsulfonyl-amino- phenylamino) propionate | " |
| 102 | 2-amino 5-nitro benzonitrile | ethyl 3-(5-benzoylamino 2-carbomethoxy phenylamino propionate | " |
| 103 | 2-amino | 2-(2-carbomethoxy | " |

-continued

| Ex. | A—NH$_2$ Base | Coupler of formula (II) | Color on polyester |
|---|---|---|---|
| 104 | 3-chloro 5-nitro benzonitrile | 5-chloro phenylamino) ethanol | |
| | 2,4,6-trinitro aniline | N-(2-carbomethoxy 5-chloro phenyl) ethylamine | " |
| 105 | 2,6-dichloro 4-nitro aniline | methyl N-(2-hydroxyethyl)anthranilate | yellow brown |
| 106 | 2-chloro-4-nitro aniline | N-(2-hydroxyethyl) anthranilate | orange |

EXAMPLE 107

A fabric of polyester (polyethylene glycol terephthalate) fibers is printed with a printing paste containing 20 parts of the dyestuff described in example 80, 150 parts of a sulfonated castor oil sodium salt, 600 parts of a thickener and 250 parts of water. After drying, the fabric is heat set for a minute at 200° C. then subjected to a reducing treatment. There is obtained a scarlet shade presenting general good fastnesses, in particular a remarkable light fastness.

EXAMPLE 108

There are ground 1 part of the dyestuff obtained according to example 6 with 2 parts of a 50% aqueous solution of sodium salt of 1,1'-dinaphthyl 2,2'-methanedisulfonic acid. This dyeing preparation is dried, then diluted with 40 parts of water and 2 parts of 40% acetic acid are added, then water is added to obtain a dye bath of 4000 parts.

In this bath, brought to 50° C., are introduced 100 parts of polyester fibers, in a period of a half hour the temperature is raised to 120°-125° C. and dyeing is performed at this temperature for an hour in a closed container. Careful rinsing is then performed. There is obtained an intense scarlet dyeing having a remarkable resistance to light and excellent general properties.

EXAMPLE 109

A fabric of poly-ethylene glycol terephthalate fibers is sized in a solution of 10 parts of the dyestuff of example 74 in 1000 parts by volume of trichlorethylene, the fabric is dried and heat set for one minute at 180° C. then subjected to a reducing treatment. A red shade with general good fastnesses is obtained.

Further modifications and variations will be apparent to those skilled in the art.

What is claimed is:

1. A dyestuff represented by the formula:

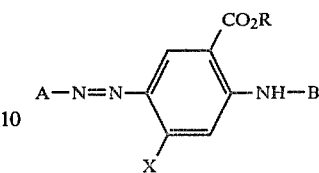

wherein A is 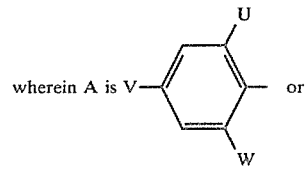 or

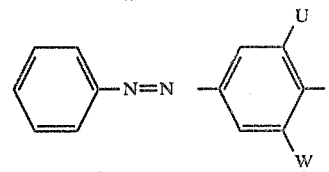

U is chlorine, bromine, cyano, nitro, carbomethoxy, carbethoxy or mesyl,

V is cyano, nitro or mesyl,

W is hydrogen, chlorine, bromine, cyano or nitro,

R is alkyl containing 1 to 4 carbon atoms,

X is hydrogen, bromine, chlorine, acetylamino, benzoylamino, alkoxycarbonylamino containing 2 to 5 carbon atoms, phenoxycarbonylamino, alkylsulfonylamino containing 1 to 4 carbon atoms or phenylsulfonyamino, and B is $\beta$-chlorethyl, $\beta,\gamma$-dichloropropyl, 3,3,4,4,4-pentafluorobutyl, alkyl containing 1 to 4 carbon atoms unsubstituted or mono-substituted by cyano, nitro, phenyl, phenoxy, alkoxy containing 1 to 4 carbon atoms, carbophenoxy, alkylsulfonyl containing 1 to 4 carbon atoms, phenylsulfonyl, acetyl, cyanalkoxy containing 2 to 5 carbon atoms or carbalkoxy containing 2 to 5 carbon atoms, said carbalkoxy being unsubstituted or mono-substituted by cyano, acetyl or carbalkoxy containing 2 to 5 carbon atoms, or —(CH$_2$)$_n$—OR' wherein n is a whole number from 1 to 4 and R' is hydrogen, acetyl, propionyl, butyryl, benzoyl, carbalkoxy containing 2 to 5 carbon atoms, carbophenoxy, alkylsulfonyl containing 1 to 4 carbon atoms or phenylsulphonyl.

2. A mixture of dyestuffs according to claim 1.

* * * * *